United States Patent [19]
Valaitis et al.

[11] Patent Number: 4,803,020
[45] Date of Patent: Feb. 7, 1989

[54] PROCESS FOR RADIATION CURING OF EPDM ROOF SHEETING UTILIZING CROSSLINKING PROMOTERS

[75] Inventors: Joseph K. Valaitis, Brecksville; James A. Davis, Uniontown, both of Ohio

[73] Assignee: The Firestone Tire & Rubber Company, Akron, Ohio

[21] Appl. No.: 115,312

[22] Filed: Nov. 2, 1987

[51] Int. Cl.$^4$ ............................................. B29C 35/10
[52] U.S. Cl. .................. 264/22; 264/211.24; 264/236; 264/347
[58] Field of Search ............... 264/22, 25, 236, 347, 264/175, 211.24

[56] References Cited

U.S. PATENT DOCUMENTS

| | | | |
|---|---|---|---|
| 2,978,396 | 4/1961 | Shewmaker et al. | 522/5 |
| 3,226,312 | 12/1965 | Lamm et al. | 427/412 |
| 3,414,498 | 12/1968 | Shinohara et al. | 522/70 |
| 3,565,870 | 2/1971 | Iino | 264/236 |
| 3,988,227 | 10/1976 | Eldred | 524/571 |
| 3,989,611 | 11/1976 | Shurpik | 522/67 |
| 4,029,730 | 6/1977 | Schroeder | 264/315 |
| 4,049,757 | 9/1977 | Kammel et al. | 264/22 |
| 4,102,761 | 7/1978 | Bohm et al. | 522/112 |
| 4,148,780 | 4/1979 | Blümel et al. | 264/175 |
| 4,161,556 | 7/1979 | Lenard et al. | 427/389.7 |
| 4,197,381 | 4/1980 | Alia | 264/349 |
| 4,213,815 | 7/1980 | Goldberg et al. | 264/22 |
| 4,220,512 | 9/1980 | Bohm et al. | 522/112 |
| 4,384,944 | 5/1983 | Silver et al. | 524/496 |
| 4,439,388 | 3/1984 | Groepper | 264/131 |
| 4,442,167 | 4/1984 | Iwasa et al. | 264/176.1 |

FOREIGN PATENT DOCUMENTS

| | | | |
|---|---|---|---|
| 55-41216 | 3/1980 | Japan | 264/22 |
| 61-213229 | 9/1986 | Japan | 264/347 |

OTHER PUBLICATIONS

Kirk-Othmer Encyclopedia of Chemical Technology, 3rd edition, vol. 19, 1982, John Wiley, pp. 607-624.
The RMA Roofing Council ANSI/RMA IPR-1/1985 (approved 8/14/85), pp. 1 and 2.

Primary Examiner—Jeffery Thurlow
Attorney, Agent, or Firm—Frank J. Troy, Sr.

[57] ABSTRACT

EPDM roof sheeting is prepared by ionizing radiation curing of a sheet calendered from 100 parts uncured EPDM elastomer, 40-150 parts carbon black, 30-100 parts process oil and an ionizing radiation crosslinking promoter. Preferably, the promoter is dicumyl peroxide, $\alpha,\alpha'$bis (t-butylperoxy) diisopropylbenzene, liquid high vinyl 1,2-polybutadiene resin or ethylene glycol dimethacrylate and an average dose of ionizing radiation of about 15 to about 35 megarads is used to produce sheeting meeting RMA (Rubber Manufacturers Association) Roofing Council tensile strength and elongation requirements for non-reinforced black EPDM rubber sheeting used in roofing applications.

10 Claims, No Drawings

PROCESS FOR RADIATION CURING OF EPDM ROOF SHEETING UTILIZING CROSSLINKING PROMOTERS

TECHNICAL FIELD

This invention relates to preparing EPDM sheeting suitable for roofing purposes, that is, which is suitable for use as elastomeric roof sheeting.

BACKGROUND OF THE INVENTION

Elastomeric roof sheeting is used as single ply roofing membrane for industrial and commerical flat roofs. Such membranes are generally applied to the roof surface in vulcanized or cured state.

Because of outstanding weathering resistance and flexibility, cured ethylene-propylene-diene elastomer (EPDM) based roof sheeting (referred to herein as "EPDM" sheeting) has been rapidly gaining acceptance. This material normally is prepared by vulcanizing uncured composition in the presence of sulfur or sulfur containing compounds such as mercaptans. These sulfur cured materials have disadvantages in heat aging resistance and in uniformity of physical properties.

Consideration has been given to overcoming these disadvantages by utilizing radiation curing instead of sulfur curing. However, radiation curing is at a cost disadvantage to sulfur curing.

An object of this invention is to obtain the benefits of radiation curing in the production of EPDM sheeting while reducing the cost disadvantages.

SUMMARY OF THE INVENTION

It has been discovered herein that the aforestated object is obtained by including in the composition subjected to radiation curing, radiation crosslinking promoter which reduces the radiation dosage required to complete curing and obtain desired physical properties. The process herein not only provides sheeting of improved heat aging properties and better physical property uniformity than sulfur cured EPDM sheeting but allows elimination of dusting agent (i.e., talc, mica, and the like) required in sulfur curing and reduction of the amount of carbon black filler utilized.

In a preferred embodiment herein EPDM compounds can be cured utilizing high energy ionizing radiation at doses which are sufficiently low to be commerically useful to produce EPDM sheeting useful for roofing purposes. The resulting sheeting has physical and chemical properties which compare favorably with those of EPDM sheeting produced utilizing sulfur curing.

As indicated above, the process herein is for preparing EPDM sheeting suitable for roofing purposes. This process comprises the steps of (a) preparing a sheet having a thickness ranging from 10 to 150 mils from uncured EPDM based composition and (b) treating said sheet with ionizing radiation to provide cured product, i.e., cured EPDM sheeting. The uncured EPDM based composition of step (a) comprises (i) 100 parts uncured ethylene-propylene-diene (EPDM) elastomer containing an ethylene to propylene mole ratio ranging from about 3:1 to about 1:3, from about 2 to about 15 double bonds per thousand carbon atoms and a number average molecular weight ranging from about 20,000 to about 200,000, (ii) from about 40 parts to about 150 parts carbon black, (iii) from about 30 parts to about 100 parts process oil and (iv) and an amount of compatible ionizing radiation crosslinking promoter effective to promote curing in radiation treating step (b).

The term "EPDM" as used throughout the specification and claims is used in the sense of its definition as found in ASTM-D-1418-64 and is intended to mean a terpolymer of ethylene, propylene and a diene monomer.

The number average molecular weights set forth herein and the weight average molecular weights set forth herein are as determined by GPC.

All parts herein are by weight unless otherwise stated.

DETAILED DESCRIPTION OF THE INVENTION

In step (a) of the process referred to above, the ingredients are admixed and the admixture is converted to sheet form, as described below.

As indicated above, the ingredients broadly comprise 100 parts uncured ethylene-propylene-diene (EPDM) elastomer (sometimes referred to hereinafter as EPDM ingredient), from about 40 parts to about 150 parts carbon black, from about 30 parts to about 100 parts process oil and an amount of compatible radiation crosslinking promoter effective to promote curing in radiation treating step (b).

As indicated above, the uncured ethylene-propylene-diene (EPDM) elastomer ingredient in a broad embodiment of the invention contains an ethylene to propylene mole ratio ranging from about 3:1 to about 1:3, from about 2 to about 15 double bonds per 1000 carbon atoms and a number average molecular weight ranging from about 20,000 to about 200,000. Normally it has a weight average molecular weight ranging from about 40,000 to about 2,000,000 and a ratio of weight average molecular weight to number average molecular weight ranging from about 2 to 10. Preferably, the uncured ethylene-propylene-diene (EPDM) elastomer ingredient contains by weight from 35% to 70% ethylene and from 30% to 65% propylene and contains from about 2 to about 15 double bonds per 1000 carbon atoms, a number average molecular weight ranging from about 80,000 to about 150,000, a weight average molecular weight ranging from about 300,000 to about 1,000,000 and a ratio of weight average molecular weight to number average molecular weight ranging from 2 to 5. Very preferably the uncured ethylene-propylene-diene (EPDM) elastomer ingredient has an ethylene to propylene mole ratio ranging from about 1.5:1 to about 1:1.5.

The diene monomer utilized in forming the uncured ethylene-propylene-diene (EPDM) elastomer ingredient is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1, 5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like.

Suitable uncured ethylene-propylene-diene (EPDM) elastomer ingredient is available commercially. A preferred EPDM elastomer ingredient is Vistalon 6505 which is available from Exxon. It has an ethylene propylene mole ratio of 53/47 and the diene is 5-ethylidene-2-norbornene. It contains 12 double bonds per 1000 carbon and has a number average molecular weight of about 100,000.

If desired, the uncured ethylene-propylene-diene (EPDM) elastomer ingredient can be prepared by methods well known in the art. Illustrative methods are found in U.S. Pat. No. 3,280,082 and British Pat. No. 1,030,289, the disclosures of which are incorporated by reference.

We turn now to the carbon black ingredient. It is included as a filler. It is used in an amount of about 40 parts to about 150 parts per 100 parts of EPDM ingredient, preferably in an amount of about 60 parts to about 100 parts per 100 parts of EPDM ingredient. The preferred range herein represents a reduction in amount of carbon black compared to the 130–135 parts per hundred parts of EPDM ingredient normally used in preparing sulfur cured EPDM sheeting. The carbon black useful herein is any carbon black. Preferred are furnace blacks such as GPF (general purpose furnace), FEF (fast extrusion furnace) and SRF (semi-reinforcing furnace).

We turn now to the process oil ingredient. It is included to improve the processing behavior of the composition (i.e. reduce mixing time and increase rate of sheet forming). As indicated above, the process oil is included in an amount ranging from about 30 parts to about 100 parts process oil per 100 parts EPDM ingredient, preferably in an amount ranging from about 35 parts to about 50 parts process oil per 100 parts EPDM ingredient. A preferred processing oil is a paraffinic oil, e.g. Sunpar 2280 which is available from the Sun Oil Company. Aromatic-type petroleum oils including naphthenic oils are also useful.

We turn now to the radiation crosslinking promoter ingredient. This ingredient promotes crosslinking in the curing of the EPDM ingredient in step (b) herein and thereby reduces the dosage of ionizing radiation required in step (b) to obtain a degree of curing providing desired physical properties. Such ingredient should be compatible with the other ingredients and function to reduce the dosage of ionizing radiation to obtain curing as described herein. Such promoter is ordinarily used in an amount ranging from about 1 to about 30 parts of promoter per 100 parts EPDM ingredient and preferred or useful amounts within such range depend on the particular promoter or class of promoters.

Very suitable ionizing radiation crosslinking promoters include, for example, organic peroxides, organic hydroperoxides, liquid high vinyl 1,2-polybutadiene resin, ethylene glycol dimethacrylate, and pentaerythritol resin.

Suitable organic peroxides include, for example, di-tertiary-alkyl peroxides (such as di-tert-butyl peroxide and di-tert-amyl peroxide), dicumyl peroxide, acetyl peroxide, benzoyl peroxide, decanoyl peroxide, lauryl peroxide, tert-butyl peroxyacetate, tert-butyl peroxybenzoate, tert-butyl peroxy(2-ethylhexanoate), tert-butyl peroxyisobutyrate, tert-butylperoxy isopropylcarbonate, tert-butylperoxymaleic acid, tert-butyl peroxyphthalic acid, tert-butyl peroxydivalerate,$\alpha,\alpha'$bis(t-butylperoxy) diisopropylbenzene, methyl ethyl ketone peroxide, and cyclohexanone peroxide; preferred organic peroxides are dicumyl peroxide and $\alpha,\alpha'$bis (t-butylperoxy) diisopropylbenzene. Dicumyl peroxide is commercially available under the name Di-Cup R from Hercules, Inc. A very useful form of dicumyl peroxide is dicumyl peroxide precipitated on calcium carbonate (peroxide content 40%) and is sold under the name Di-Cup 40C by Hercules, Inc. The $\alpha,\alpha'$bis (t-butylperoxy) diisopropylbenzene is available under the name Vul-Cup R from Hercules, Inc. Preferably, organic peroxides are included in an amount of from about 1.5 to about 6 parts organic peroxide (100 percent active basis) per 100 parts EPDM ingredient.

Suitable hydroperoxides include, for example, tert-butyl hydroperoxide and cumene hydroperoxide. These preferably are included in an amount from about 1.5 to about 6 parts organic peroxide (100% active basis) per 100 parts EPDM ingredient.

Suitable liquid high vinyl 1,2-polybutadiene resin contains, for example, from 80% to 95% 1,2-vinyl content. A very suitable resin of this type contains 90% 1,2-vinyl content and is available under the name Nisson B-3000 from E. L. Puskas Company. It is preferably used in an amount ranging from about 8 parts to about 15 parts per 100 parts of EPDM ingredient.

Suitable ethylene glycol dimethacrylate is available under the name Sartomer SR-206 from Sartomer Resins, Inc. It is preferably used in an amount ranging from about 8 to about 20 parts per 100 parts of EPDM ingredient.

Suitable pentaerythritol resin is prepared from tall oil and is available under the name Pental A from Hercules, Inc. It is preferably used in an amount ranging from about 8 to 20 parts per 100 parts EPDM ingredient.

Optional ingredients include, for example, other elastomers (e.g., butyl elastomer, neutralized sulfonated EPDM, neutralized sulfonated butyl) in place of minor amounts of the EPDM, inorganic fillers (e.g., talc, mica, clay, silicates, whiting) with total filler content usually ranging from about 10 to about 400 parts by weight per 100 parts of elastomer, and conventional amounts of other conventional agents, such as zinc oxide, stearic acid, antioxidants, antiozonants, flame retardants, and the like.

The compounding ingredients can be admixed, utilizing an internal mixer (such as a Banbury mixer), an extruder, and/or a two-roll mill, or other mixers suitable for forming viscous relatively uniform admixtures. When utilizing a type B Banbury internal mixer, in a preferred mode, the dry or powdery materials such as carbon black are added first followed by the liquid process oil and finally the EPDM elastomer (this type of mixing can be referred to as an upside-down mixing technique) and the radiation crosslinking promoter can be incorporated in the Banbury mixer, but more preferably is incorporated utilizing a two-roll mill.

The resulting admixture is sheeted to thickness ranging from 10 to 150 mils, preferably from 35 to 60 mils, by conventional sheeting methods, for example calendering or extrusion. Preferably, the admixture is sheeted to at least 40 gauge (0.040 inches) which is the minimum thickness specified in standards set by the Roofing Council of the Rubber Manufacturers Association for non-reinforced black EPDM rubber sheets for use in roofing applications. In many cases, the admixture is sheeted to 40–45 gauge thickness since this is the thickness for a large percentage of "single ply" roofing membranes used commercially. The sheeting can be cut to desired length and width dimensions at this time or after curing.

We turn now to step (b), that is to the curing step wherein the sheeted admixture of ingredients is treated with ionizing radiation to provide cured EPDM sheeting.

Ordinarily, curing is suitably accomplished by application of an average dose of ionizing radiation ranging from about 5 to about 40 megarads, and when preferred radiation crosslinking promoters are utilized, excellent physical properties are ordinarily obtained with the application of an average dose of ionizing radiation of from about 15 to about 35 megarads. In the application of ionizing radiation, the radiation horn is aimed at the sheet surface. The surface receives the greatest dosage, and lower doses are received as the radiation penetrates the thickness of the sheet. The average dose is the average applied to all parts.

In a preferred process, the radiation is applied in two passes wherein ionizing radiation is directed at one side of a sheet in a first pass and at the other side of the sheet in a second pass and approximately half the total dose is applied in each pass.

In a preferred process, the radiation crosslinking promoter and amount thereof and average radiation dose are selected to provide product (i.e., cured EPDM sheeting) meeting tensile strength and elongation minimums as set forth by the Roofing Council of the Rubber Manufacturers Association for non-reinforced black EPDM rubber sheets for use in roofing application, i.e., a tensile strength minimum of 1305 psi (ASTM Test Method D 412) and an elongation at break minimum of 300% (ASTM Test Method D 412).

The term "ionizing radiation" as used herein includes high energy radiation such as gamma rays, X-rays, beta rays, and accelerated electrons, protons and alpha particles. Electrons accelerated through 300,000 volts or more, gamma rays and X-rays are ordinarily the most practical forms of suitable ionizing radiation.

Conventional radiation equipment and techniques can be employed in the practice of this invention. For example, the desired amount of ionizing radiation can be obtained using a 300 KEV electron accelerator which emits a circular beam of electrons from a heated cathode filament. The electrons are guided through a scanning magnet and emerge through a thin titanium window which is approximately 1 to 24 inches. A beam power of 3 kw is obtained at an operating current of 10 Mamps. The dose delivered can be measured using the well known blue cellophane technique, Henley and Richman; Anal. Chem. 28, 1580 (1956). By altering the beam current, beam diameter and distance to the source, various dose rates of radiation can be obtained. Electron accelerators with energy ratings of from 10 KEV to 10 MEV are readily available and suitable for practice of the invention. A very suitable apparatus is an electron accelerator (1 MEV) commercially available from Radiation Dynamics.

In preferred embodiments herein, the term "EPDM Sheeting" refers to non-reinforced black EPDM rubber sheets for use in roofing applications as referred to by the Roofing Council of the Rubber Manufacturers Association, i.e., non-reinforced black vulcanized rubber sheet made from ethylene-propylene-diene terpolymer intended for use in single-ply roof membranes exposed to weather.

The invention is illustrated in the following examples:

In the following examples, in each case the ingredients, except for crosslinking promoter, were 100 parts Vistalon 6505, 80 parts FEF black and 40 parts Sunpar 2280 oil. For the control, no radiation crosslinking promoter was added. In the other runs crosslinking promoters were added as specified.

In each run the following admixing procedure was utilized. The compounds were mixed continuously in a laboratory B Banbury using an upside-down mixing procedure. In particular, the carbon black was added at zero time, the process oil was added immediately thereafter and the EPDM terpolymer was added after 15 to 30 seconds of continuous mixing. Then mixing was carried out continuously for about 3 to 4 minutes to ensure a uniform dispersion. During mixing the temperature was maintained below 280° F. Radiation crosslinking promoters were incorporated into the resulting admixture using a two-roll mill where mixing was continued for up to 6 to 8 minutes at a stock temperature of 125 to 160° F. The stock admixture was compression molded to 40 gauge thick slabs (dimensions 1½×4×0.040 inches) by pressing between mylar film in a positive pressure mold, and pressure was applied to the mold using a Wabash hydraulic curing press. The slabs were each pressed for 8 minutes at 165° F. For application of radiation the slabs were placed on a slow moving conveyor and exposed to radiation in a first pass, and then the slabs were turned over and exposed to radiation in a second pass, so that in the first pass radiation was directed to one side of a slab and in the second pass radiaton was directed at the other side of the slab. Approximately 50% of the total average radiation dosage was applied in each pass. The apparatus used to impart radiation was an electron accelerator (1 MEV) commercially available from Radiation Dynamics. During radiation application, the temperature was allowed to reach ambient conditions. Stress-strain properties were determined on the radiation cured slabs in accordance with ASTM D412-80, Method B (cut ring specimens).

The following results were obtained.

REFERENCE EXAMPLE I

Three runs were carried out for control slabs (no radiation crosslinking promoter). In a first run, the average radiation dose applied in the first pass was 4.332 megarads and in the second pass was 4.738 megarads (denoted 4.332/4.738 megarads below). In a second run, the average radiation dose applied in the first pass was 9.410 megarads and in the second pass was 9.019 megarads (denoted 9.410/9.019 megarads below). In a third run, the average radiation dose applied in the first pass was 13.742 megarads and the average dose applied in the second pass was 13.757 megarads (denoted 13.742/13.757 megarads below). Results are presented in Table I below:

TABLE I

| | Control | | |
|---|---|---|---|
| | Run 1 4.332/4.738 | Run 2 9.410/9.019 | Run 3 13.742/13.757 |
| 100% Modulus, psi | 140 | 185 | 250 |
| 200% Modulus, psi | 225 | 410 | 615 |
| 300% Modulus, psi | 335 | 670 | 975 |
| Tensile Strength, psi | 535 | 1050 | 1375 |
| Elongation at break, % | 750 | 575 | 470 |

EXAMPLE I

Three runs were carried out on slabs formulated from composition containing as a radiation crosslinking promoter 10 parts per 100 parts EPDM elastomer of Nisson B-3000 (liquid high vinyl 1,2-polybutadiene resin containing 90% 1,2-vinyl content). The radiation dosages applied were the same as in Reference Example I.

The results are set forth in Table II below:

TABLE II

| 10 parts - Nisson B-3000 | | | |
|---|---|---|---|
| | Run 1 | Run 2 | Run 3 |
| | 4.332/4.738 | 9.410/9.019 | 13.742/13.757 |
| 100% Modulus, psi | 125 | 220 | 290 |
| 200% Modulus, psi | 230 | 500 | 755 |
| 300% Modulus, psi | 350 | 835 | 1200 |
| Tensile Strength, psi | 650 | 1350 | 1725 |
| Elongation at break, % | 615 | 470 | 390 |

EXAMPLE II

Example I was duplicated except that the slabs were formulated from composition containing 15 parts per 100 parts EPDM of Nisson B-3000.

Results are set forth in Table III below:

TABLE III

| 15 parts - Nisson B-3000 | | | |
|---|---|---|---|
| | Run 1 | Run 2 | Run 3 |
| | 4.332/4.738 | 9.410/9.019 | 13.742/13.757 |
| 100% Modulus, psi | 125 | 205 | 295 |
| 200% Modulus, psi | 230 | 465 | 755 |
| 300% Modulus, psi | 350 | 765 | 1175 |
| Tensile Strength, psi | 585 | 1250 | 1685 |
| Elongation at break, % | 590 | 465 | 400 |

EXAMPLE III

Example I was duplicated except that the slabs were formulated from composition containing 20 parts per 100 parts EPDM of Nisson B-3000.

Results are set forth in Table IV below:

TABLE IV

| 20 parts - Nisson B-3000 | | | |
|---|---|---|---|
| | Run 1 | Run 2 | Run 3 |
| | 4.332/4.738 | 9.410/9.019 | 13.742/13.757 |
| 100% Modulus, psi | 125 | 205 | 285 |
| 200% Modulus, psi | 225 | 465 | 710 |
| 300% Modulus, psi | 350 | 755 | 1075 |
| Tensile Strength, psi | 605 | 1125 | 1400 |
| Elongation at break, % | 585 | 470 | 370 |

EXAMPLE IV

Three runs were carried out where the slabs were formulated utilizing 3.0 parts per 100 parts EPDM of Di-cup R (dicumyl peroxide, peroxide content 98%-100%) as radiation crosslinking promoter. In the first run the dosages were 6.045 megarads in the first pass and 5.932 megarads in the second pass (denoted 6.045/5.932 below). In the second run the dosages were 9.609 megarads in the first pass and 9.409 megarads in the second pass (denoted 9.609/9.409 below). In the third run the dosages were 15.654 megarads in the first pass and 15.341 megarads in the second pass (denoted 15.654/15.341 below).

Results are set forth in Table V below:

TABLE V

| 3 parts Di-Cup R | | | |
|---|---|---|---|
| | Run 1 | Run 2 | Run 3 |
| | 6.045/5.932 | 9.609/9.409 | 15.654/15.341 |
| 100% Modulus, psi | 130 | 200 | 260 |
| 200% Modulus, psi | 235 | 475 | 670 |
| 300% Modulus, psi | 350 | 800 | 1100 |
| Tensile Strength, psi | 600 | 1325 | 1630 |

TABLE V-continued

| 3 parts Di-Cup R | | | |
|---|---|---|---|
| | Run 1 | Run 2 | Run 3 |
| | 6.045/5.932 | 9.609/9.409 | 15.654/15.341 |
| Elongation at break, % | 620 | 470 | 410 |

EXAMPLE V

Three runs were carried out as Example IV except that the radiation crosslinking promoter was 7.5 parts per 100 parts EPDM of Di-Cup 40C (dicumyl peroxide on precipitated calcium carbonate, 40% peroxide content).

Results are set forth below in Table VI:

TABLE VI

| 7.5 Parts Di-Cup 40C | | | |
|---|---|---|---|
| | Run 1 | Run 2 | Run 3 |
| | 6.045/5.932 | 9.609/9.409 | 15.654/15.341 |
| 100% Modulus, psi | 135 | 195 | 260 |
| 200% Modulus, psi | 230 | 485 | 685 |
| 300% Modulus, psi | 350 | 825 | 1125 |
| Tensile Strength, psi | 595 | 1375 | 1555 |
| Elongation at break, % | 625 | 475 | 382 |

EXAMPLE VI

Three runs were carried out as in Example IV except that the radiation crosslinking promoter was 3.0 parts per 100 parts EPDM of Vul-Cup R, i.e., α,α'bis(t-butylperoxy) diisopropylbenzene (peroxide content 96%-100%).

Results are set forth in Table VII below:

TABLE VII

| 3 Parts Vul-Cup R | | | |
|---|---|---|---|
| | Run 1 | Run 2 | Run 3 |
| | 6.045/5.932 | 9.609/9.409 | 15.654/15.341 |
| 100% Modulus, psi | 125 | 230 | 290 |
| 200% Modulus, psi | 235 | 575 | 830 |
| 300% Modulus, psi | 375 | 985 | 1425 |
| Tensile Strength, psi | 680 | 1565 | 1840 |
| Elongation at break, % | 620 | 440 | 375 |

EXAMPLE VII

Three runs were carried out where slabs were formulated from 10 parts per 100 parts EPDM of Pental A (pentaerythritol resin prepared from tall oil). In the first run the dosages were 4.881 megarads in the first pass and 4.926 megarads in the second pass (denoted 4.881/4.926 below). In the second run the dosages were 9.776 megarads in the first pass and 9.719 megarads in the second pass (denoted 9.776/9.719 below). In the third run the dosages were 14.903 megarads in the first pass and 14.948 megarads in the second pass (denoted 14.903/14.948 below).

Results are set forth in Table VIII below:

TABLE VIII

| 10 Parts Pental A | | | |
|---|---|---|---|
| | Run 1 | Run 2 | Run 3 |
| | 4.881/4.926 | 9.776/9.719 | 14.903/14.948 |
| 100% Modulus, psi | 105 | 150 | 180 |
| 200% Modulus, psi | 150 | 300 | 385 |
| 300% Modulus, psi | 200 | 450 | 600 |
| Tensile Strength, psi | 325 | 840 | 1125 |
| Elongation at break, % | 760 | 655 | 575 |

EXAMPLE VIII

Three runs were carried out as in Example VII except that the radiation crosslinking promoter was 15 parts per 100 parts of EPDM of Pental A.
Results are set forth below in Table IX:

TABLE IX

| | 15 Parts Pental A | | |
|---|---|---|---|
| | Run 1 | Run 2 | Run 3 |
| | 4.881/4.926 | 9.776/9.719 | 14.903/14.948 |
| 100% Modulus, psi | 100 | 125 | 150 |
| 200% Modulus, psi | 135 | 225 | 305 |
| 300% Modulus, psi | 175 | 335 | 465 |
| Tensile Strength, psi | 250 | 640 | 875 |
| Elongation at break, % | 815 | 680 | 625 |

EXAMPLE IX

Three runs were carried out as in example VII except that the radiation crosslinking promoter was 20 parts per 100 parts of EPDM of Pental A.
Results are set forth below in Table X:

TABLE X

| | 20 Parts Pental A | | |
|---|---|---|---|
| | Run 1 | Run 2 | Run 3 |
| | 4.881/4.926 | 9.776/9.719 | 14.903/14.948 |
| 100% Modulus, psi | 90 | 150 | 140 |
| 200% Modulus, psi | 110 | 200 | 275 |
| 300% Modulus, psi | 150 | 300 | 420 |
| Tensile Strength, psi | 190 | 560 | 835 |
| Elongation at break, % | 905 | 775 | 700 |

EXAMPLE X

Three runs were carried out as in Example VII except that the radiation crosslinking promoter was 10 parts per 100 parts EPDM of Sartomer SR-206 (ethylene glycol dimethacrylate).
Results are set forth below in Table XI:

TABLE XI

| | 10 Parts Sartomer SR-206 | | |
|---|---|---|---|
| | Run 1 | Run 2 | Run 3 |
| | 4.881/4.926 | 9.776/9.719 | 14.903/14.948 |
| 100% Modulus, psi | 125 | 185 | 230 |
| 200% Modulus, psi | 225 | 435 | 600 |
| 300% Modulus, psi | 355 | 730 | 975 |
| Tensile Strength, psi | 650 | 1250 | 1485 |
| Elongation at break, % | 645 | 520 | 425 |

EXAMPLE XI

Three runs were carried out as in Example VII except that the radiation crosslinking promoter was 15 parts per 100 parts EPDM of Sartomer SR-206.
Results are set forth below in Table XII below:

TABLE XII

| | 15 Parts Sartomer SR-206 | | |
|---|---|---|---|
| | Run 1 | Run 2 | Run 3 |
| | 4.881/4.926 | 9.776/9.719 | 14.903/14.948 |
| 100% Modulus, psi | 120 | 175 | 235 |
| 200% Modulus, psi | 215 | 415 | 605 |
| 300% Modulus, psi | 330 | 760 | 1025 |
| Tensile Strength, psi | 685 | 1325 | 1510 |
| Elongation at break, % | 640 | 505 | 410 |

EXAMPLE XII

Three runs were carried out as in Example VII except that the radiation crosslinking promoter was 20 parts per 100 parts EPDM of Sartomer SR-206.
The results are set forth below in Table XIII below:

TABLE XIII

| | 20 Parts Sartomer SR-206 | | |
|---|---|---|---|
| | Run 1 | Run 2 | Run 3 |
| | 4.881/4.926 | 9.776/9.719 | 14.903/14.948 |
| 100% Modulus, psi | 150 | 220 | 300 |
| 200% Modulus, psi | 275 | 500 | 755 |
| 300% Modulus, psi | 415 | 815 | 1175 |
| Tensile Strength, psi | 750 | 1360 | 1600 |
| Elongation at break, % | 630 | 495 | 385 |

Other variations will be evident to those skilled in the art. Therefore, the scope of the invention is intended to be defined by the claims.

What is claimed is:

1. A process for preparing EPDM sheeting suitable for roofing purposes, said process comprising the steps of
   (a) preparing a sheet having a thickness ranging from 10 to 150 mils composed of composition comprising (i) 100 parts uncured ethylene-propylene-diene (EPDM) elastomer containing an ethylene to propylene ratio ranging from about 3:1 to about 1:3, from about 2 to about 15 double bonds per 1000 carbon atoms and a number average molecular weight ranging from about 20,000 to about 200,000, (ii) from about 40 parts to about 150 parts carbon black, (iii) from about 30 parts to about 100 parts process oil and (iv) an amount of compatible radiation crosslinking promoter effective to promote curing in step (b), said radiation crosslinking promoter being selected from the group consisting of organic peroxides and liquid high vinyl 1,2-polybutadiene resin,
   (b) treating said sheet with ionizing radiation to provide cured EPDM sheeting, said ionizing radiation being directed at both sides of the sheet.

2. The process of claim 1 wherein, in step (b), said sheet is treated with an average dose of ionizing radiation of from about 5 to about 40 megarads to effect said curing.

3. The process of claim 2 wherein step (b) is carried out in two passes wherein ionizing radiation is directed in the first pass at one side of the sheet and in the second pass at the other side of the sheet.

4. The process of claim 2 wherein the radiation crosslinking promoter is selected from the group consisting of dicumyl peroxide, α,α'bis (t-butylperoxy) diisopropylbenzene, and liquid high vinyl 1,2-polybutadiene resin.

5. The process of claim 1 wherein in step (a), the sheet has a thickness ranging from 35 to 60 mils and is composed of composition comprising (1) 100 parts uncured ethylene-propylene-diene (EPDM) elastomer containing an ethylene to propylene ratio ranging from about 1.5:1 to about 1:1.5, from about 2 to about 15 double bonds per 1000 carbon atoms and a number average molecular weight ranging from about 80,000 to about 150,000, (ii) from about 60 parts to about 100 parts carbon black, (iii) from about 35 parts to about 50 parts process oil, and (iv) from about 1 to about 30 parts of said radiation crosslinking promoter, and wherein in step (b) said sheet is treated with an average dose of ionizing radiation of from about 5 to about 40 megarads to effect said curing.

6. The process of claim 5 wherein the radiation crosslinking promoter is selected from the group consisting of dicumyl peroxide, α,α'bis (t-butylperoxy) diisopropylbenzene, and liquid high vinyl 1,2-polybutadiene resin.

7. The process of claim 6 wherein said composition of step (a) contains as radiation crosslinking promoter from about 1.5 to about 6 parts organic peroxide (100 percent active basis) and wherein in step (b) said sheet is treated with an average dose of ionizing radiation of from about 15 megarads to about 35 megarads to provide cured EPDM sheeting having a tensile strength of at least 1305 psi and an elongation at break of at least 300%.

8. The process of claim 7 wherein said organic peroxide is selected from the group consisting of dicumyl peroxide and α,α'bis (t-butylperoxy) diisopropylbenzene.

9. The process of claim 8 wherein step (b) is carried out in two passes wherein ionizing radiation is directed in the first pass at one side of the sheet and in the second pass at the other side of the sheet.

10. The process of claim 1 wherein the radiation crosslinking promoter and amount thereof and the dose of ionizing radiation is such as to provide cured EPDM sheeting having a tensile strength of at least 1305 psi and an elongation at break of at least 300%.

* * * * *